US010783522B2

United States Patent
Mossoba et al.

(10) Patent No.: US 10,783,522 B2
(45) Date of Patent: Sep. 22, 2020

(54) PRE-DESIGNATED FRAUD SAFE ZONES

(71) Applicant: Capital One Services, LLC, McLean, VA (US)

(72) Inventors: Michael Mossoba, Arlington, VA (US); Abdelkader Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 80 days.

(21) Appl. No.: 16/041,988

(22) Filed: Jul. 23, 2018

(65) Prior Publication Data
US 2020/0027092 A1    Jan. 23, 2020

(51) Int. Cl.
*G06Q 20/32*     (2012.01)
*G06Q 20/42*     (2012.01)
*G06Q 20/08*     (2012.01)

(52) U.S. Cl.
CPC ......... *G06Q 20/42* (2013.01); *G06Q 20/0855* (2013.01)

(58) Field of Classification Search
CPC ..................................................... G06Q 20/32
See application file for complete search history.

(56) References Cited

U.S. PATENT DOCUMENTS 8,032,438 B1 * 10/2011 Barton .................. G06Q 20/10
                                                                    235/380
8,369,869 B2 *  2/2013 Muller ................. G01S 5/0205
                                                                    455/456.1
9,852,427 B2 * 12/2017 Caldera ................ G06Q 20/381
2012/0158586 A1 *  6/2012 Ganti ...................... G06Q 20/10
                                                                    705/44
2014/0180974 A1 *  6/2014 Kennel .................. G06N 7/005
                                                                    706/12

(Continued)

FOREIGN PATENT DOCUMENTS

EP          3007122 A1 *  4/2016 ............. G06Q 20/32

OTHER PUBLICATIONS

S. Keegan, G.M.P. O'Hare, M.J. O'Grady, Easishop: Ambient intelligence assists everyday shopping, Information Sciences, vol. 178, Issue 3, (Year: 2008).*

*Primary Examiner* — Hani M Kazimi
(74) *Attorney, Agent, or Firm* — DLA Piper LLP (US)

(57) ABSTRACT

Embodiments disclosed herein generally related to a system and method for exempting a transaction from a transaction hold. A computing system determines that an account associated with a user has been compromised. The computing system places a transaction hold on the account that has been compromised. The computing system generates one or more safe zones based at least on historical transaction data associated with the user. The one or more safe zones exempt from the transaction hold. The computing system receives a verification request for a transaction associated with the account. The verification request includes at least a merchant identification code associated with the third party merchant. The computing system determines that the third party merchant is included in at least one safe zone of the one or more safe zones. Based on the determination, the computing system verifies the transaction with the server of the third party merchant.

18 Claims, 5 Drawing Sheets

(56) References Cited

U.S. PATENT DOCUMENTS

| | | | |
|---|---|---|---|
| 2014/0207674 A1* | 7/2014 | Schroeder | G06Q 20/1085 705/43 |
| 2016/0104163 A1* | 4/2016 | Aquino | G06Q 40/12 705/44 |
| 2017/0169432 A1* | 6/2017 | Arvapally | G06Q 20/4016 |
| 2018/0121922 A1* | 5/2018 | Zoldi | G06Q 10/0635 |

* cited by examiner

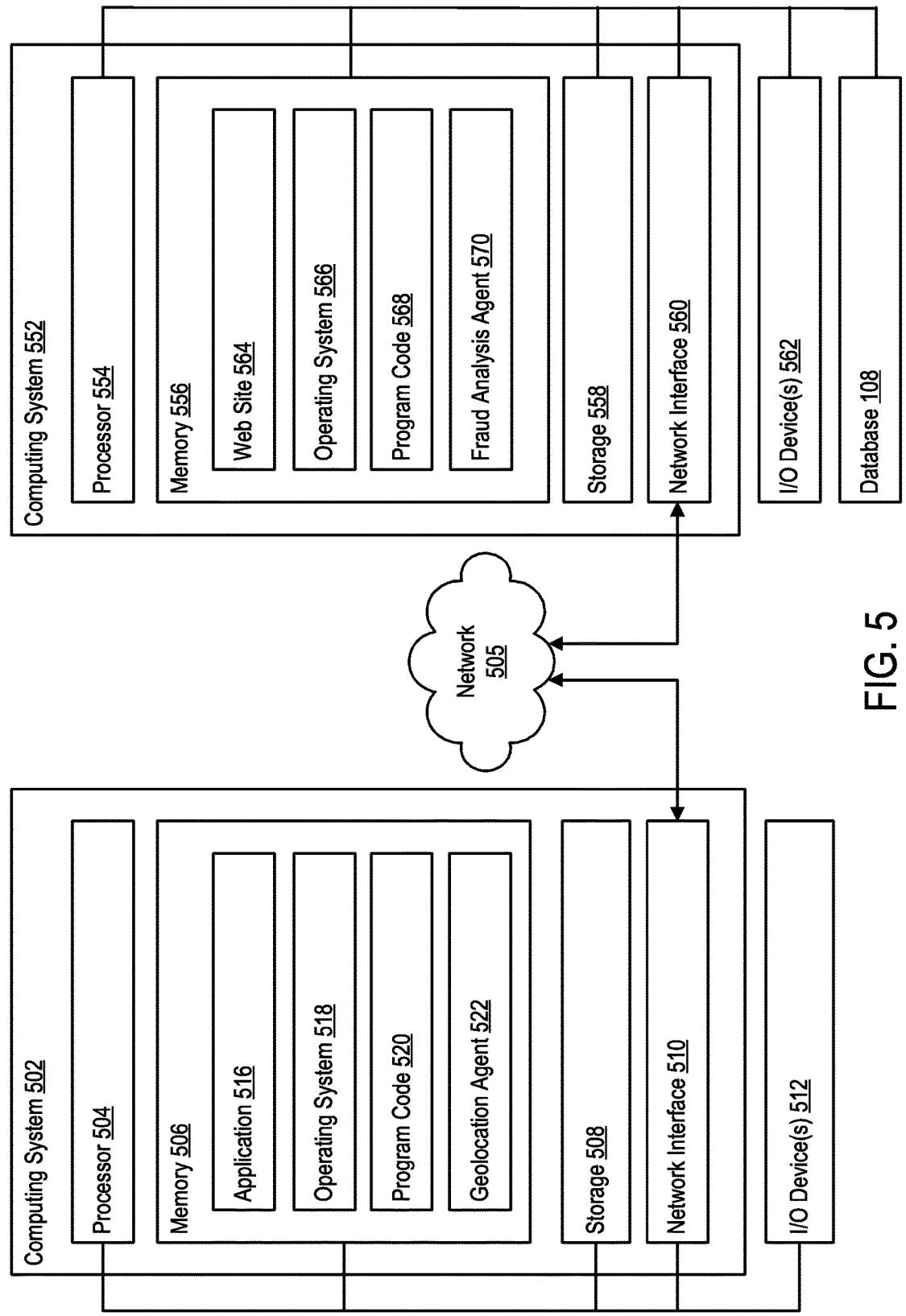

PRE-DESIGNATED FRAUD SAFE ZONES

FIELD OF THE DISCLOSURE

The present disclosure generally relates to a method and a system for exempting certain transactions from a transaction hold.

BACKGROUND

Currently, there are various means in which consumers may transact with third party vendors. Credit card products are one instrument that are offered and provided to consumers by credit card issuers (e.g., banks and other financial institutions). With a credit card, an authorized consumer is capable of purchasing services and/or merchandise without an immediate, direct exchange of cash. Rather, the consumer incurs debt with each purchase. Debit cards are another type of instrument offered and provided by banks (or other financial institutions) that are associated with the consumer's bank account (e.g., checking account). Transactions made using a debit card are cleared directly from the cardholder's bank account. Still further, in the digital age, a consumer may use a computing device, such as a mobile phone, to perform various transactions.

SUMMARY

Embodiments disclosed herein generally related to a system and method for preventing fraudulent transactions. In one embodiment, a method is disclosed herein. A computing system determines that an account associated with a user has been compromised. The computing system places a transaction hold on the account that has been compromised. The computing system generates one or more safe zones based at least on historical transaction data associated with the user. The one or more safe zones exempt from the transaction hold. The computing system receives a verification request for a transaction associated with the account. The verification request includes at least a merchant identification code associated with the third party merchant. The computing system determines that the third party merchant is included in at least one safe zone of the one or more safe zones. Based on the determination, the computing system verifies the transaction with the server of the third party merchant.

In some embodiments, generating the one or more safe zones based at least on historical transaction data associated with the user includes the computing system identifying a pattern of transactions based on merchant identification code associated with third party merchants.

In some embodiments, generating the one or more safe zones based at least on historical transaction data associated with the user includes the computing system.

In some embodiments, generating the one or more safe zones based at least on historical transaction data associated with the user includes the computing system identifying a pattern of transactions based on merchant information associated with third party merchants. The merchant information includes at least one of merchant identification code, address, partial address, global positioning system (GPS) coordinates, and name.

In some embodiments, generating the one or more safe zones based at least on historical transaction data associated with the user includes the computing system identifying one or more third party merchants within a predefine radius from an address associated with the account.

In some embodiments, generating the one or more safe zones based at least on historical transaction data associated with the user includes the computing system receiving, from a client device of the user, one or more predefined merchants to be included in the one or more safe zones.

In some embodiments, the computing system further receives from a second server of a second third party merchant, a second verification request for a second transaction associated with the account. The second verification request includes at least a second merchant identification code associated with the second third party merchant. The computing system determines that the second third party merchant is not included in at least one safe zone of the one or more safe zones. Based on the determination, the computing system rejects the second transaction with the second server of the second third party merchant.

In some embodiments, the computing system further notifies the user of the one or more safe zones by transmitting a push notification to a client device associated with the user.

In another embodiment, a method of preventing a fraudulent transaction is disclosed herein. A computing system receives a verification request from a server of a third party merchant for a transaction associated with a compromised account. The verification request includes one or more characteristics associated with the transaction. The computing system compares the one or more characteristics to one or more pre-defined rules that exempt transactions from a transaction hold associated with the compromised account. The computing system determines that at least one rule of the one or more pre-defined rules applies. Based on the determination, the computing system verifies the transaction.

In some embodiments, the verification request may include merchant information associated with the third party merchant. The merchant information includes at least one of at least one of a merchant identification code, a merchant category code, address, partial address, global positioning system (GPS) coordinates, name, and a location.

In some embodiments, comparing the one or more characteristics to the one or more predefined rules includes the computing system identifying the location associated with the third party merchant. The computing system determines that the location is within a pre-defined radius set by the third party merchant.

In some embodiments, comparing the one or more characteristics to the one or more predefined rules includes the computing system transmitting a request to a client device associated with a use. The request prompts the user to share a location of the client device with the computing system. The computing system receives, from the client device, the location of the client device. The computing system determines that the location of the client device is within a pre-defined radius from the third party merchant.

In some embodiments, the verification request further includes an indication of whether the transaction is a card-present transaction or a card-not-present transaction.

In some embodiments, comparing the one or more characteristics to the one or more predefined rules includes the computing system identifying that the transaction is a card-not-present transaction. The computing system compares the one or more characteristics to a subset of the one or more predefined rules. The subset of the one or more predefined rules is distinct from a second subset of the one or more predefined rules associated with a card-present transaction.

In some embodiments, the computing system further receives, from a second server of a second third party merchant, a second verification request for a second transaction associated with the compromised account. The second verification request includes a second set of one or more characteristics associated with the second transaction. The computing system compares the second set of one or more characteristics to one or more pre-defined rules that exempt transactions from the transaction hold associated with the compromised account. The computing system determines that at least one rule of the second set of the one or more pre-defined rules applies. Based on the determination, the computing system verifies the second transaction.

In another embodiment, a system is disclosed herein. The system includes a processor and a memory. The memory has programming instructions stored thereon, which, when executed by the processor, performs an operation. The operation includes generating one or more pre-defined rules that exempt transactions from a transaction hold based on historical information associated with a compromised account. The operation further includes receiving a verification request from a server of a third party merchant for a transaction associated with the compromised account. The verification request includes one or more characteristics associated with the transaction. The operation further includes comparing the one or more characteristics to the one or more pre-defined rules that exempt transactions from the transaction hold associated with the compromised account. The operation further includes determining that at least one rule of the one or more pre-defined rules applies. The operation further includes verifying, by the computing system, the transaction with the server of the third party merchant based on the determination.

In some embodiments, the verification request may include merchant information associated with the third party merchant. The merchant information includes at least one of at least one of a merchant identification code, a merchant category code, address, partial address, global positioning system (GPS) coordinates, name, and a location.

In some embodiments, the operation of comparing the one or more characteristics to the one or more predefined rules includes identifying the location associated with the third party merchant and determining that the location is within a pre-defined radius set by the third party merchant.

In some embodiments, the operation of comparing the one or more characteristics to the one or more predefined rules includes transmitting a request to a client device associated with a user, receiving, from the client device, the location of the client device, and determining that the location of the client device is within a pre-defined radius from the third party merchant. The request prompts the user to share a location of the client device with the computing system In some embodiments, the verification request further comprises an indication of whether the transaction is a card-present transaction or a card-not-present transaction.

In some embodiments, the operation of comparing the one or more characteristics to the one or more predefined rules includes identifying that the transaction is a card-not-present transaction and comparing the one or more characteristics to a subset of the one or more predefined rules. The subset of the one or more predefined rules is distinct from a second subset of the one or more predefined rules associated with a card-present transaction.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 5 is a block diagram illustrating a computing environment, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein are generally directed to a method and a system for exempting certain transactions from an account hold (e.g., transaction hold). In conventional systems, upon determining that an incoming transaction may be fraudulent, financial institutions may place a "transaction hold" on a user's account. When a transaction hold is placed on a user's account, a customer may not be able to use the compromised payment card (e.g., credit card, debit card, etc.) to make a purchase, until, for example, the transaction hold is lifted (e.g., through the issuance of a new payment device). Transaction holds, however, may create several issues. For example, when a transaction hold is in place, the user may not have the means to otherwise make purchases. Such situations may create issues, for example, when the user is on vacation or in need of a necessity (e.g., gas), and does not have any other means of payment available.

The one or more techniques disclosed herein address the limitations of conventional systems by defining one or more "safe zone" rules that exempt certain transactions from a transaction hold. In some embodiments, the one or more safe zone rules may be user defined. For example, the user may navigate to preferences in his or her user account to define one or more rules that exempt transactions from a transaction hold. In some embodiments, the one or more safe zone rules may be defined by the financial institution. For example, the institution may analyze a user's transactional history to create one or more rules based on a likelihood that the transaction is not fraudulent. As such, the present disclosure provides techniques for allowing users to continue to make purchases during a transaction hold in limited situations.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
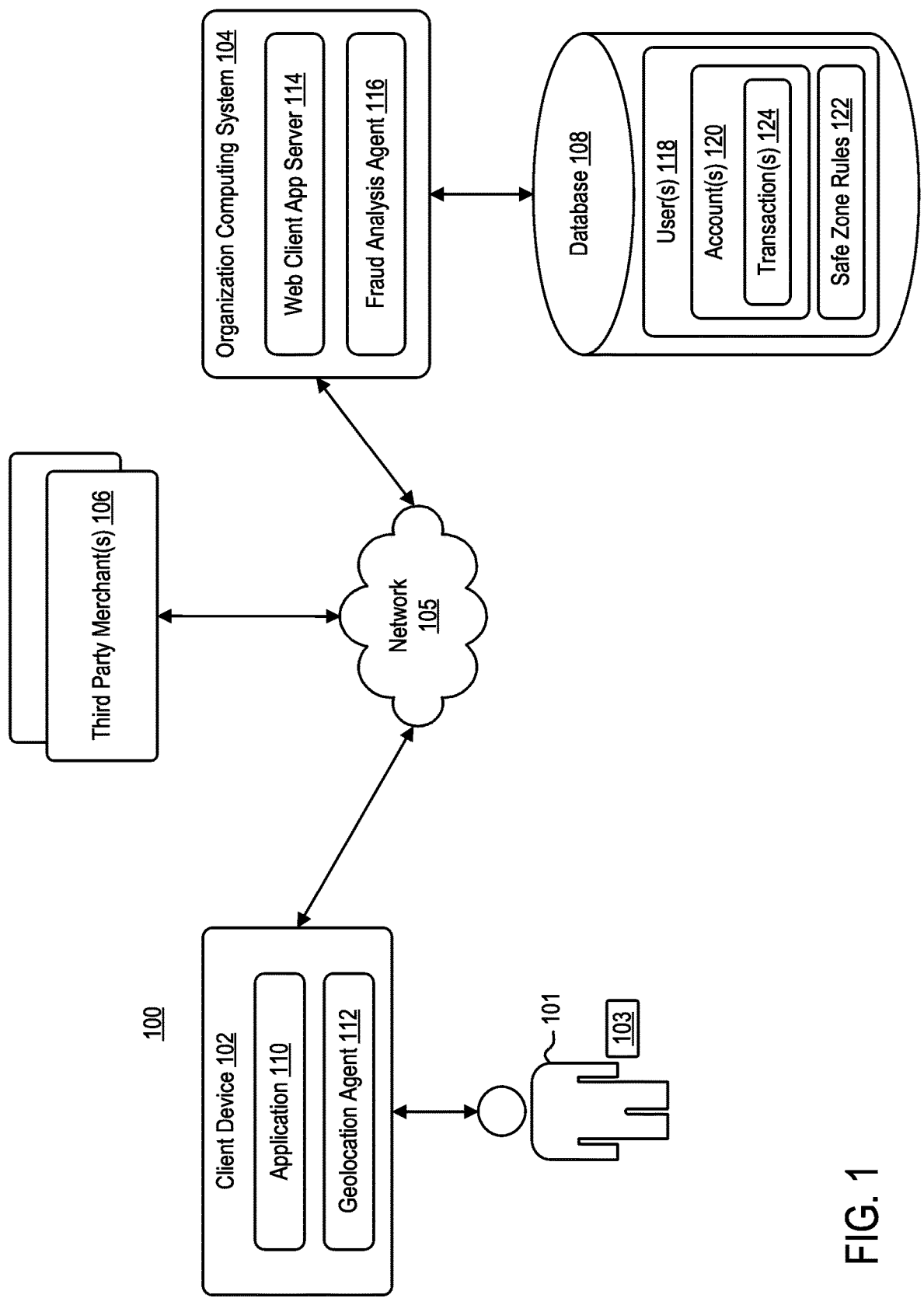
FIG. 1 is a block diagram illustrating a computing environment, according to one exemplary embodiment.

FIG. 1 is a block diagram illustrating a computing environment 100, according to one embodiment. Computing environment 100 may include at least a client device 102 (operated, for example, by user 101), an organization computing system 104, and one or more third party merchants 106 communicating via network 105. In some embodiments, user 101 may have payment device 103. Payment device 103 may be representative of a payment card, such as, but not limited to, a credit card, a check/debit card, a pre-paid card, and the like.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of system 100.

Client device 102 may be operated by a user (or customer). For example, client device 102 may be a mobile device, a tablet, a desktop computer, or any computing system having the capabilities described herein. Client device 102 may belong to or be provided to a customer (e.g., user 101) or may be borrowed, rented, or shared. Customers may include individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 110 and geolocation agent 112. Application 110 may be representative of a web browser that allows access to a website or a stand-alone application. Client device 102 may access application 110 to access functionality of organization computing system 104. Client device 102 may communicate over network 105 to request a webpage, for example, from web client application server 114 of organization computing system 104. For example, client device 102 may be configured to execute application 110 to access content managed by web client application server 114. The content that is displayed to client device 102 may be transmitted from web client application server 114 to client device 102, and subsequently processed by application 110 for display through a graphical user interface (GUI) of client device 102.

Geolocation agent 112 may be one or more software modules. The one or more software modules are collections of signals stored on a media (e.g., memory of client device 102) that represent a series of machine instructions (e.g., program code) that implements one or more algorithmic steps. Such machine instructions may be the actual computer code the processor of client device 102 interprets to implement the instructions, or, alternatively, may be a higher level coding of the instructions that is interpreted to obtain the actual computer code. The one or more software modules may also include one or more hardware components. One or more aspects of the algorithm may be performed by the hardware components (e.g., circuitry) itself, rather as a result of an instruction.

Geolocation agent 112 may be configured to track a location of client device 102. For example, when enabled, geolocation agent 112 may utilize one or more global positioning system (GPS) modules to identify a current location of client device 102.

Client device 102 may communicate with one or more third party merchants 106 over network 105. Third party merchants 106 may comprise one or more computing systems associated with a third party vendor (e.g., third party merchant). In operation, user may transact with a third party merchant 106 via client device 102 or payment device 103. In some embodiments, user 101 may conduct a "card not present transaction" in which user 101 does not physically present a payment card to third party merchant 106 during a transaction. In some embodiments, user 101 may conduct a "card present" transaction in which user 101 physically presents a payment card, such as payment card 103, to third party merchant 106 during a transaction (e.g., physical swipe via magnetic strip or physical insertion via EMV chip).

Organization computing system 104 may include at least fraud analysis agent 116. Fraud analysis agent 116 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Fraud analysis agent 116 may be configured to track one or more transactions associated with a user's account. In some embodiments, fraud analysis agent 116 may track the one or more transactions to determine whether a transaction (or multiple transactions) may be fraudulent. For example, upon receiving an incoming transaction request from a third party merchant 106, fraud analysis agent 116 may parse the incoming transaction request and compare the request to one or more posted transactions associated with the user's account. Using one or more fraud analysis algorithms, fraud analysis agent 116 may determine whether the incoming transaction may be fraudulent. If fraud analysis agent 116 determines that the incoming transaction is (or may be) fraudulent, then fraud analysis agent 116 can put a hold on all transactions (i.e., a "transaction hold"). During a transaction hold, the user can no longer use the device (i.e., payment card) that triggered the transaction hold. For example, the user may not transact using the payment card in a card-present transaction. In another example, the user may not transact by entering the payment card information in a card-not-present transaction.

Organization computing system 104 may communicate with database 108. As illustrated, database 108 may include one or more user accounts 118. Each user account 118 may correspond to a respective user of the organization associated with organization computing device 104. Each user account 118 may include one or more accounts 120 having one or more transactions 124 and safe zone rules 122. Each account 120 may correspond to a respective financial account with the organization. For example, within user account 118 may be one or more credit card accounts and one or more debit card accounts. Safe zone rules 122 may be representative of a set of rules for incoming transactions that may exempt a transaction from a transaction hold (when in place).

In some embodiments, safe zone rules 122 may be user defined. For example, the user may upload to the user's account 118 one or more rules that exempt incoming transactions from a transaction hold. Such rules may include, for example, a geographic location, a monetary limit, specific third party merchants, specific types of third party merchants, specific types of transactions (e.g., card-present vs. card-not-present), and the like.

In some embodiments, safe zone rules 122 may be defined by fraud analysis agent 116. For example, fraud analysis agent 116 may implement one or more machine learning algorithms to aid in analyzing user's transactions 124 to generate one or more safe zone rules 122. In a specific example, through analyzing user's transactions 124, fraud analysis agent 116 may set as safe zone rules, that any transaction below the amount of $15 between the hours of 8 a.m. and 10 a.m. from a coffee shop in a specific zip code may be exempt from the transaction hold. Fraud analysis agent 116 may make this determination based on historical transaction information in user's account. In another example, fraud analysis agent 116 may set as safe zone rules, that any transaction below the amount of $60 from a gas station may be exempt from the transaction. In general, fraud analysis agent 116 may set one or more rules that exempt from the transaction hold based on a determination that there is a small likelihood that a transaction satisfying the rule is fraudulent.

Although safe zone rules 122 is illustrated as being account 120 agnostic, those skilled in the art may readily understand that each account 120 may include its own respective set of safe zone rules 122.

Figure 2B:
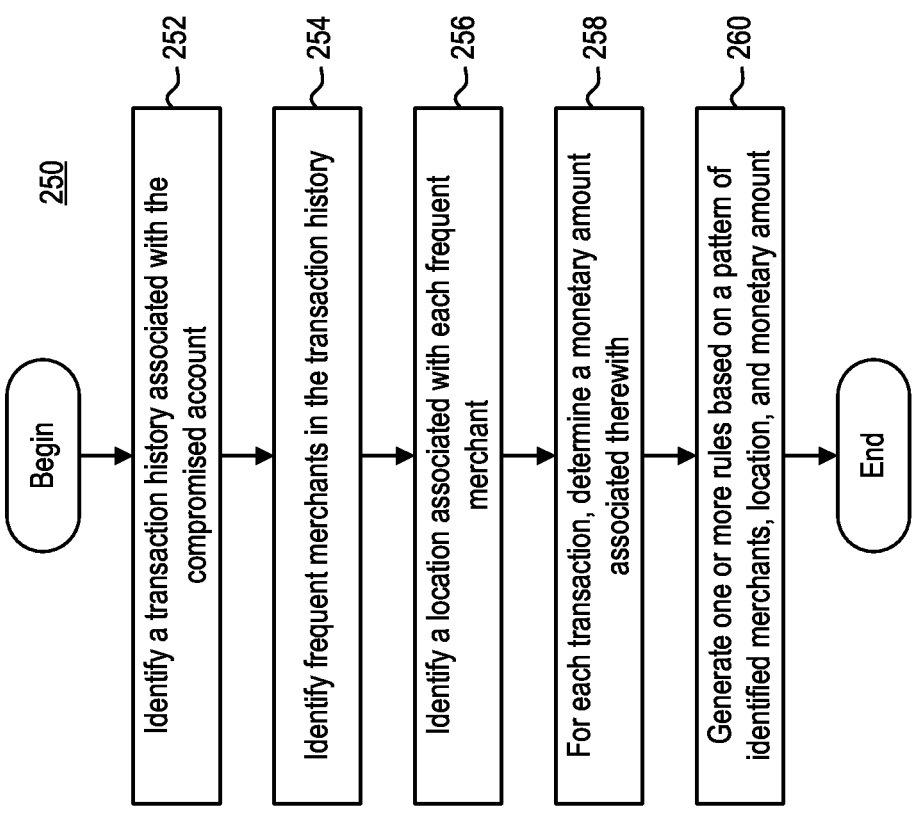
FIG. 2B is a flow diagram illustrating a method of generating one or more rules exempt from a transaction hold, according to one embodiment.
Figure 2A:
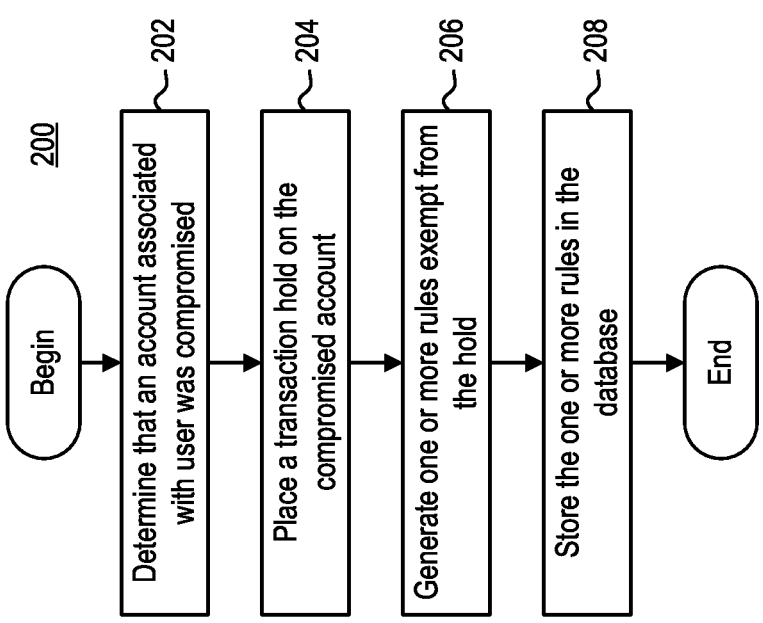
FIG. 2A is a flow diagram illustrating a method of generating one or more rules exempt from a transaction hold, according to one embodiment.

FIG. 2A is a flow diagram illustrating a method 200 of generating one or more rules exempt from a transaction hold, according to one embodiment. Method 200 may begin at step 202. At step 202, organization computing system 104 may determine that an account associated with user 101 was compromised. For example, fraud analysis agent 116, using one or more fraud algorithms, may determine that an incoming transaction may be fraudulent.

At step 204, based on the determination, organization computing system 104 may place a transaction hold on the compromised account. For example, upon receiving a transaction confirmation request from a third party merchant 106, organization computing system 104 may reject the transaction request if there is a transaction hold in place.

At step 206, organization computing system 104 may generate one or more rules that exempt certain transactions from the transaction hold. For example, fraud analysis agent 116 may parse user's transaction history to generate one or more rules that exempt certain transactions from the transaction hold.

FIG. 2B is a flow diagram illustrating a method 250 of generating one or more rules exempt from a transaction hold, according to one embodiment. Method 250 may begin at step 252. At step 252, fraud analysis agent 116 may identify a transaction history associated with the compromised account. For example, fraud analysis agent 116 may query database 108 to retrieve the transaction history associated with the compromised account. The transaction history may include one or more transactions 124.

At step 254, fraud analysis agent 116 may identify one or more frequent third party merchants with which user 101 frequently transacts. In some embodiments, fraud analysis agent 116 may identify the one or more frequent third party merchants based on a merchant category code associated therewith. For example, a merchant category code may refer to a predetermined code assigned to each merchant. Such codes may be determined, by either organization computing system 104 or a third party merchant 106, based, for example, on the industry or retail segment associated with a particular merchant. For instance, a restaurant may be accorded code 1234, a grocery store may be accorded code 1324, and an automated fuel dispenser may be accorded code 4321. Based on this code, organization computing system 104 is able to discern a merchant type corresponding to a third party merchant 106 of the potential transaction.

In some embodiments, fraud analysis agent 116 may identify a specific third party merchant with which user 101 frequently transacts. For example, when an incoming potential transaction is received by third party organization 106, the incoming potential transaction may include metadata associated therewith. Metadata may include, for example, a name of the third party organization from which the incoming potential transaction originated.

At step 256, fraud analysis agent 116 may identify a location associated with each identified frequent third party merchant. For example, as recited above, the incoming potential transaction may include metadata associated therewith. Metadata may further include, for example, at least a zip code from which the incoming potential transaction originated. In some embodiments, the metadata may further include one or more of a street address, city, and state from which the incoming potential transaction originated.

At step 258, fraud analysis agent 116 may identify a monetary amount associated with each transaction. For example, when a transaction is posted to a user's account, the transaction may also include the monetary amount associated therewith.

At step 260, fraud analysis agent 116 may generate one or more rules based on a pattern of the identified merchants, location, and monetary amount associated therewith. In some embodiments, fraud analysis agent 116 may generate a set of safe zone rules 122 for card-not-present transactions and a separate set of safe zone rules 122 for card-present transactions. For example, fraud analysis agent 116 may determine that there is a greater likelihood that a transaction is not fraudulent when the transaction is a card-present transaction. Accordingly, fraud analysis agent 116 may define more stringent safe zone rules 122 for card-not-present transactions, while defining less stringent rules for card-present transactions. For example, fraud analysis agent 116 may set a limit of $25 on card-not-present transactions, while setting a higher limit of $50 on card-present transactions.

Referring back to FIG. 2A, after organization computing system 104 generates the one or more rules, organization computing system 104 may store the one or more rules in database 108. In some embodiments, organization computing system 104 may store the one or more rules such that the one or more rules are specific to the account 120 that included that transaction hold. In some embodiments, organization computing system 104 may store the one or more rules more generally, such that the one or more rules are specific to all accounts 120 in user account 118.

Figure 3:
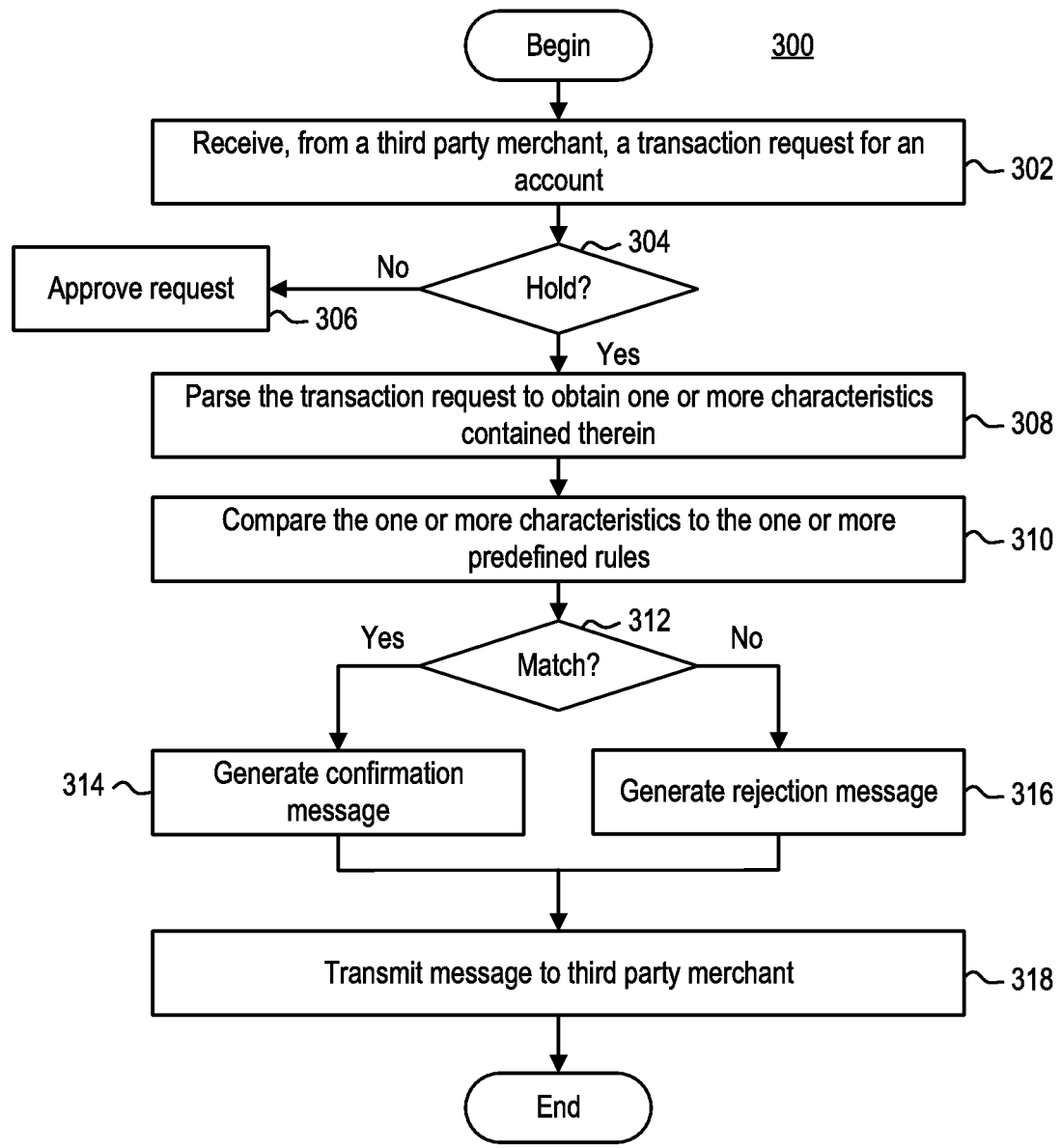
FIG. 3 is a flow diagram illustrating a method of exempting certain transactions from an account hold, according to one embodiment.

FIG. 3 is a flow diagram of a method 300 of exempting certain transactions from an account hold, according to one embodiment. Method 300 may begin at step 302. At step 302, organization computing system 104 may receive a transaction request from a third party merchant 106 for an account with organization computing system. In some embodiments, transaction request may include metadata associated therewith. The metadata may include, for example, one or more of an account number associated with a payment device used by user 101, a merchant name, a merchant category code, a location of the merchant (e.g., street address, city, state, zip code, etc.), a type of transaction (e.g., card-present or card-not-present), and a monetary amount associated therewith.

At step 304, organization computing system 104 may determine whether there is a hold on the account associated with the transaction request. For example, organization computing system 104 may determine whether fraud analysis agent 116 previously flagged the account due to a potential fraudulent transaction. If, at step 304, organization computing system 104 determines that there is not a hold on the user's account, then at step 306, organization computing system 104 approves the transaction request.

If, however, at step 304, organization computing system 104 determines that there is a hold on the user's account, then method 300 proceeds to step 308. At step 308, organization computing system 104 may parse the transaction request to identify one or more characteristics associated therewith. For example, fraud analysis agent 116 may parse the metadata associated with the transaction request to identify the one or more characteristics. As such, fraud analysis agent 116 may identify one or more of a merchant name, a merchant category code, an address of the merchant, a type of transaction (e.g., card-present or card-not-present), a transaction amount, and the like.

At step 310, organization computing system 104 may compare the one or more characteristics of the transaction request to one or more predefined rules. For example, fraud analysis agent 116 may compare the one or more characteristics to the one or more rules 122 stored in database 108. In some embodiments, fraud analysis agent 116 may identify one or more queries based on the identified one or more characteristics to determine if a rule 122 applies. For example, assume a transaction request is received that includes the characteristics: Merchant A, Merchant Category Code 1234, area code 01234, and transaction amount $75. Fraud analysis agent 116 may generate one or more queries using one or more combinations of the identified characteristics. An example query may be: Merchant A and transaction amount $75. Another example query may be: Merchant Category Code 1234.

At step 312, organization computing system 104 may determine if there is a match between one or more characteristics of the transaction request and one or more stored rules 122. If, at step 312, organization computing system 104 determines that there is a match, then at step 314, organization computing system 104 may generate a confirmation message. If, however, at step 312, organization computing system 104 determines that there is not at match, then at step 316, organization computing system 104 may generate a rejection message.

At step 318, organization computing system 104 may transmit the message to third party merchant 106. For example, if organization computing system 104 determines that a rule applies, then organization computing system 104 determined that the incoming transaction is exempt from the transaction hold, and therefore, transmits a confirmation message to third party merchant 106.

Figure 4:
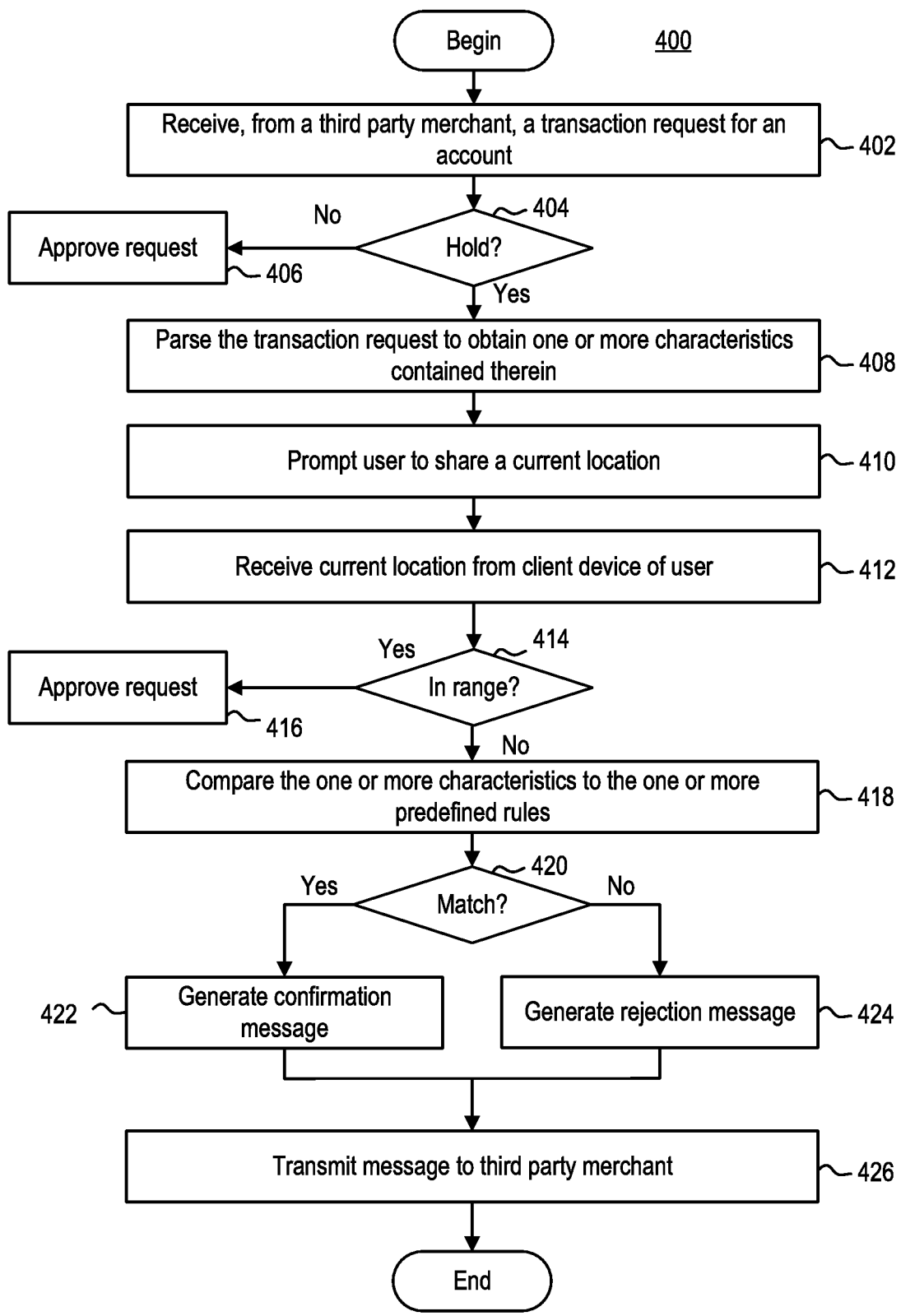
FIG. 4 is a flow diagram illustrating a method of exempting certain transactions from an account hold, according to one embodiment.

FIG. 4 is a flow diagram of a method 400 of exempting certain transactions from an account hold, according to one embodiment. Method 400 begins at step 402. At step 402, organization computing system 104 may receive a transaction request from a third party merchant 106 for an account with organization computing system. In some embodiments, transaction request may include metadata associated therewith. The metadata may include, for example, one or more of an account number associated with a payment device used by user 101, a merchant name, a merchant category code, a location of the merchant (e.g., street address, city, state, zip code, etc.), a type of transaction (e.g., card-present or card-not-present), and a monetary amount associated therewith.

At step 404, organization computing system 104 may determine whether there is a hold on the account associated with the transaction request. For example, organization computing system 104 may determine whether fraud analysis agent 116 previously flagged the account due to a potential fraudulent transaction. If, at step 404, organization computing system 104 determines that there is not a hold on the user's account, then at step 406, organization computing system 104 approves the transaction request.

If, however, at step 404, organization computing system 104 determines that there is a hold on the user's account, then method 400 proceeds to step 408. At step 408, organization computing system 104 may parse the transaction request to identify one or more characteristics associated therewith. For example, fraud analysis agent 116 may parse the metadata associated with the transaction request to identify the one or more characteristics. As such, fraud analysis agent 116 may identify one or more of a merchant name, a merchant category code, an address of the merchant, a transaction amount, a type of transaction (e.g., card-present or card-not-present), and the like.

At step 410, organization computing system 104 may prompt the user to share a current location of the user. For example, organization computing system 104 may transmit a notification to be displayed to the user via application 110 executing on client device 102. The notification to be displayed to the user via client device 102 may request that the user turn on location services.

At step 412, organization computing system 104 may receive a current location of the user. For example, upon user 101 enabling location services on client device 102, client device 102 may transmit the current location to organization computing system 104 via application 110.

At step 414, organization computing system 104 may determine whether the user's current location is within a predefined range of third party merchant 106 from which the transaction request originated. The predefined range may be stored as a rule 122 in user account 118.

If, at step 414, organization computing system 104 determines that the user's current location is within the predefined range of third party merchant 106, then at step 416, organization computing system 104 approves the request. If, however, at step 414, organization computing system 104 determines that the user's current location is not within the predefined range of third party merchant 106, then method 400 proceeds to step 418.

At step 418, organization computing system 104 may compare the one or more characteristics of the transaction request to one or more predefined rules. For example, fraud analysis agent 116 may compare the one or more characteristics to the one or more rules 122 stored in database 108. In some embodiments, fraud analysis agent 116 may identify one or more queries based on the identified one or more characteristics to determine if a rule 122 applies.

At step 420, organization computing system 104 may determine if there is a match between one or more characteristics of the transaction request and one or more store rules 122. If, at step 420, organization computing system 104 determines that there is a match, then at step 422, organization computing system 104 may generate a confirmation message. If, however, at step 420, organization computing system 104 determines that there is not at match, then at step 424, organization computing system 104 may generate a rejection message.

At step 426, organization computing system 104 may transmit the message to third party merchant 106. For example, if organization computing system 104 determines that a rule applies, then organization computing system 104 determined that the incoming transaction is exempt from the transaction hold, and therefore, transmits a confirmation message to third party merchant 106.

FIG. 5 is a block diagram illustrating an exemplary computing environment 500, according to some embodiments. Computing environment 500 includes computing system 502 and computing system 552. Computing system 502 may be representative of client device 102. Computing system 552 may be representative of organization computing system 104.

Computing system 502 may include a processor 504, a memory 506, a storage 508, and a network interface 510. In some embodiments, computing system 502 may be coupled to one or more I/O device(s) 512 (e.g., keyboard, mouse, etc.).

Processor 504 may retrieve and execute program code 520 (i.e., programming instructions) stored in memory 506, as well as stores and retrieves application data. Processor 504 may be included to be representative of a single processor, multiple processors, a single processor having multiple processing cores, and the like. Network interface 510 may be any type of network communications allowing computing system 502 to communicate externally via computing network 505. For example, network interface 510 is configured to enable external communication with computing system 552.

Storage 508 may be, for example, a disk storage device. Although shown as a single unit, storage 508 may be a combination of fixed and/or removable storage devices, such as fixed disk drives, removable memory cards, optical storage, network attached storage (NAS), storage area network (SAN), and the like.

Memory 506 may include application 516, operating system 518, program code 520, and geolocation agent 522. Program code 520 may be accessed by processor 504 for processing (i.e., executing program instructions). Program code 520 may include, for example, executable instructions for communicating with computing system 552 to display one or more pages of website 564. Application 516 may enable a user of computing system 502 to access a functionality of computing system 552. For example, application 516 may access content managed by computing system 552, such as website 564. The content that is displayed to a user of computing system 502 may be transmitted from computing system 552 to computing system 502, and subsequently processed by application 516 for display through a graphical user interface (GUI) of computing system 502.

Geolocation agent 522 may correspond to geolocation agent 112. Geolocation agent 522 may be configured to track a location of computing system 502. For example, when enabled, geolocation agent 522 may utilize one or more GPS modules to identify a current location of computing system 502.

Computing system 552 may include a processor 554, a memory 556, a storage 558, and a network interface 560. In some embodiments, computing system 552 may be coupled to one or more I/O device(s) 562. In some embodiments, computing system 552 may be in communication with database 108.

Processor 554 may retrieve and execute program code 568 (i.e., programming instructions) stored in memory 556, as well as stores and retrieves application data. Processor 554 is included to be representative of a single processor, multiple processors, a single processor having multiple processing cores, and the like. Network interface 560 may be any type of network communications enabling computing system 552 to communicate externally via computing network 505. For example, network interface 560 allows computing system 552 to communicate with computer system 502.

Storage 558 may be, for example, a disk storage device. Although shown as a single unit, storage 558 may be a combination of fixed and/or removable storage devices, such as fixed disk drives, removable memory cards, optical storage, network attached storage (NAS), storage area network (SAN), and the like.

Memory 556 may include website 564, operating system 566, program code 568, and fraud analysis agent 570. Program code 568 may be accessed by processor 554 for processing (i.e., executing program instructions). Program code 568 may include, for example, executable instructions configured to perform steps discussed above in conjunction with FIGS. 2A-4. As an example, processor 554 may access program code 568 to perform operations for generating one or more rules exempt from a transaction hold. In another example, processor 554 may access program code 568 to perform operations for preventing a fraudulent transaction. Website 564 may be accessed by computing system 502. For example, website 564 may include content accessed by computing system 502 via a web browser or application.

Fraud analysis agent 570 may be configured to track one or more transactions associated with a user's account. In some embodiments, fraud analysis agent 570 may track the one or more transactions to determine whether a transaction (or multiple transactions) may be fraudulent. If fraud analysis agent 570 determines that the incoming transaction is (or may be) fraudulent, then fraud analysis agent 570 can put a hold on all transactions (i.e., a "transaction hold"). During a transaction hold, the user can no longer use the device (i.e., payment card) that triggered the transaction hold. For example, the user may not transact using the payment card in a card-present transaction. In another example, the user may not transact by entering the payment card information in a card-not-present transaction.

Fraud analysis agent 570 may implement one or more machine learning algorithms to aid in analyzing user's transactions to generate one or more safe zone rules (stored in database 108). Fraud analysis agent 570 may set one or more rules that exempt transactions that have a small likelihood of being fraudulent, based on the transaction history of the user.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of exempting one or more transactions from a transaction hold, comprising:
    determining, by a computing system, that an account associated with a user has been compromised;
    placing, by the computing system, a transaction hold on the account that has been compromised;
    learning, by the computing system via a machine learning module, a pattern of user transactions by analyzing historical transaction data associated with the user;
    generating, by the computing system, one or more safe zone rules based at least on the learned pattern of user transactions, the one or more safe zone rules exempting from the transaction hold;
    receiving, from a server of a third party merchant, a verification request for a transaction associated with the account, the verification request comprising at least a merchant identification code associated with the third party merchant;
    prompting, by the computing system, a client device of the user that initiated the transaction with the third party merchant to share its current location;
    receiving, by the computing system from a global positioning system (GPS) module of the client device, the current location of the client device;
    determining that the current location of the client device is within a predefined range of third party merchant;
    based on the determining, determining, by the computing system, that the third party merchant matches at least one safe zone rule; and
    based on the determinations, exempting, by the computing system, the transaction from the transaction hold.

2. The method of claim 1, wherein generating, by the computing system, the one or more safe zone rules based at least on the learned pattern of user transactions, comprises:
    identifying a pattern of transactions based on merchant information associated with third party merchants, the merchant information comprising at least one of merchant identification code, address, partial address, GPS coordinates, and name.

3. The method of claim 1, wherein learning, by the computing system via the machine learning module, the pattern of the user transactions by analyzing the historical transaction data associated with the user, comprises:
    identifying the pattern of transaction based on merchant category codes associated with third party merchants.

4. The method of claim 1, wherein learning, by the computing system via the machine learning module, the pattern of the user transactions by analyzing the historical transaction data associated with the user, comprises:
    identifying one or more third party merchants within a predefine radius from an address associated with the account.

5. The method of claim 1, wherein generating, by the computing system, the one or more safe zone rules based at least on the learned pattern of user transactions, comprises:
    receiving, from the client device of the user, one or more predefined merchants to be included in the one or more safe zone rules.

6. The method of claim 1, further comprising:
    receiving, from a second server of a second third party merchant, a second verification request for a second transaction associated with the account, the second verification request comprising at least a second merchant identification code associated with the second third party merchant;
    determining, by the computing system, that the second third party merchant is not included in at least one safe zone of the one or more safe zone rules; and
    based on the determination, rejecting, by the computing system, the second transaction with the second server of the second third party merchant.

7. The method of claim 1, further comprising:
    notifying, by the computing system, the user of the one or more safe zone rules by transmitting a push notification to a client device associated with the user.

8. A method of exempting one or more transactions from a transaction hold, comprising:
    generating, by a computing system, one or pre-defined rules that exempt transactions from a transaction hold by learning, by a machine learning module, a pattern of user transactions via historical transaction data associated with a user;
    receiving, by the computing system, a verification request from a server of a third party merchant for a transaction associated with a compromised account, the verification request comprising one or more characteristics associated with the transaction;
    interfacing, by the computing system, with a client device of the user to receive a current location of the client device from a global positioning system (GPS) module of the client device;
    determining that the current location of the client device is within a predefined range of third party merchant;
    based on the determining, comparing, by the computing system, the one or more characteristics to one or more pre-defined rules;

determining, by the computing system, that at least one rule of the one or more pre-defined rules applies; and based on the determinations, exempting, by the computing system, the transaction from the transaction hold.

9. The method of claim 8, wherein the verification request may include merchant information associated with the third party merchant, the merchant information comprising at least one of at least one of a merchant identification code, a merchant category code, address, partial address, GPS coordinates, name, and a location.

10. The method of claim 9, wherein comparing, by the computing system, the one or more characteristics to the one or more pre-defined rules, comprises:

identifying the location associated with the third party merchant; and determining that the location is within a pre-defined radius set by the third party merchant.

11. The method of claim 8, wherein the verification request further comprises an indication of whether the transaction is a card-present transaction or a card-not-present transaction.

12. The method of claim 11, wherein comparing, by the computing system, the one or more characteristics to the one or more predefined rules, comprises:

identifying that the transaction is a card-not-present transaction; and comparing the one or more characteristics to a subset of the one or more pre-defined rules, the subset of the one or more pre-defined rules distinct from a second subset of the one or more predefined rules associated with a card-present transaction.

13. The method of claim 8, further comprising:

receiving, from a second server of a second third party merchant, a second verification request for a second transaction associated with the compromised account, the second verification request comprising a second set of one or more characteristics associated with the second transaction;

comparing, by the computing system, the second set of one or more characteristics to one or more pre-defined rules that exempt transactions from the transaction hold associated with the compromised account;

determining, by the computing system, that at least one rule of the one or more pre-defined rules applies; and based on the determination, verifying, by the computing system, the second transaction.

14. A system, comprising:

a processor; and a memory having programming instructions stored thereon, which, when executed by the processor, performs an operation, comprising:

generating one or more pre-defined rules that exempt transactions from a transaction hold by learning, by a machine learning module, a pattern of user transactions via historical information associated with a compromised account;

receiving a verification request from a server of a third party merchant for a transaction associated with the compromised account, the verification request comprising one or more characteristics associated with the transaction;

interfacing with a client device associated with the compromised account to receive a current location of the client device from from a global positioning system (GPS) module of the client device;

determining that the current location of the client device is within a predefined range of third party merchant;

based on the determining, comparing the one or more characteristics to the one or more pre-defined rules that exempt transactions from the transaction hold associated with the compromised account;

determining that at least one rule of the one or more pre-defined rules applies; and based on the determinations, exempting the transaction from the transaction hold.

15. The system of claim 14, wherein the verification request may include merchant information associated with the third party merchant, the merchant information comprising at least one of at least one of a merchant identification code, a merchant category code, address, partial address, GPS coordinates, name, and a location.

16. The system of claim 15, wherein comparing the one or more characteristics to the one or more pre-defined rules, comprises:

identifying the location associated with the third party merchant; and determining that the location is within a pre-defined radius set by the third party merchant.

17. The system of claim 14, wherein the verification request further comprises an indication of whether the transaction is a card-present transaction or a card-not-present transaction.

18. The system of claim 17, wherein comparing the one or more characteristics to the one or more pre-defined rules, comprises:

identifying that the transaction is a card-not-present transaction; and comparing the one or more characteristics to a subset of the one or more pre-defined rules, the subset of the one or more pre-defined rules distinct from a second subset of the one or more pre-defined rules associated with a card-present transaction.

* * * * *